(12) United States Patent
Walsh et al.

(10) Patent No.: US 8,984,802 B1
(45) Date of Patent: Mar. 24, 2015

(54) REBAITABLE RODENT BAIT STATION

(75) Inventors: James R. Walsh, Wauwatosa, WI (US);
Rick Leyerle, Madison, WI (US);
Daniel C. Johnson, Madison, WI (US)

(73) Assignee: OMS Investments, Inc., Los Angeles, CA (US)

( * ) Notice: Subject to any disclaimer, the term of this patent is extended or adjusted under 35 U.S.C. 154(b) by 797 days.

(21) Appl. No.: 12/983,782

(22) Filed: Jan. 3, 2011

(51) Int. Cl.
*A01M 25/00* (2006.01)

(52) U.S. Cl.
USPC ............................................. 43/131

(58) Field of Classification Search
CPC ........................................ A01M 25/00
USPC ............................................. 43/131
See application file for complete search history.

(56) References Cited

U.S. PATENT DOCUMENTS

| | | | |
|---|---|---|---|
| 4,026,064 A * | 5/1977 | Baker | 43/131 |
| 4,127,958 A | 12/1978 | Peters | |
| 4,231,180 A | 11/1980 | Bare | |
| 4,453,337 A * | 6/1984 | Williams | 43/131 |
| 4,550,525 A | 11/1985 | Baker et al. | |
| 4,658,536 A | 4/1987 | Baker | |
| 4,660,320 A | 4/1987 | Baker et al. | |
| 5,040,327 A | 8/1991 | Stack et al. | |
| 5,044,111 A | 9/1991 | Lindros | |
| 5,044,113 A | 9/1991 | Stack et al. | |
| 5,136,803 A | 8/1992 | Sykes et al. | |
| 5,272,832 A | 12/1993 | Marshall et al. | |
| 5,448,852 A | 9/1995 | Spragins et al. | |
| 5,806,237 A * | 9/1998 | Nelson et al. | 43/131 |
| 5,960,585 A | 10/1999 | Demarist et al. | |
| 6,082,042 A | 7/2000 | Issitt | |
| 6,145,242 A | 11/2000 | Simpson | |
| 6,272,791 B1 * | 8/2001 | Pleasants | 43/131 |
| 6,397,517 B1 | 6/2002 | Leyerle et al. | |
| 6,493,988 B1 | 12/2002 | Johnson | |
| 6,513,283 B1 | 2/2003 | Crossen | |
| 6,807,768 B2 | 10/2004 | Johnson et al. | |
| 7,669,363 B2 | 3/2010 | Frisch | |
| 7,784,216 B2 | 8/2010 | Kaukeinen et al. | |
| 7,980,023 B2 | 7/2011 | Nelson et al. | |
| 7,987,629 B2 | 8/2011 | Harper | |
| 8,209,900 B2 | 7/2012 | Vickery et al. | |
| 8,683,738 B2 | 4/2014 | Pryor et al. | |
| 8,800,201 B2 | 8/2014 | Vickery et al. | |
| 2004/0244274 A1 | 12/2004 | Dellevigne et al. | |
| 2005/0028431 A1 | 2/2005 | Hoyes et al. | |
| 2006/0117644 A1 | 6/2006 | Hoyes et al. | |
| 2006/0185223 A1 | 8/2006 | Watson et al. | |
| 2008/0072475 A1 | 3/2008 | Nelson et al. | |
| 2009/0151224 A1 | 6/2009 | Nathan | |

(Continued)

FOREIGN PATENT DOCUMENTS

| | | |
|---|---|---|
| EP | 745323 A1 | 12/1996 |
| EP | 1057958 A2 | 12/2000 |

(Continued)

*Primary Examiner* — Christopher P Ellis
*Assistant Examiner* — Michael Wang
(74) *Attorney, Agent, or Firm* — Hunton & Williams LLP

(57) ABSTRACT

A rodent bait station has a plastic base with a bottom opening which receives a removable bait receptacle which is engaged by two resilient fingers to the base, and secured by a downward projection from the lid, which offers a child-resistant latch, such that the bait receptacle can only be removed for rebaiting by simultaneously deflecting the downward projection and the two fingers while extracting the receptacle.

11 Claims, 3 Drawing Sheets

(56) References Cited

U.S. PATENT DOCUMENTS

| | | |
|---|---|---|
| 2009/0229170 A1 | 9/2009 | Gaibotti |
| 2009/0307963 A1 | 12/2009 | Abbas |
| 2010/0050498 A1* | 3/2010 | Nelson et al. ............... 43/60 |
| 2010/0325940 A1* | 12/2010 | Pryor et al. ............... 43/131 |
| 2011/0219666 A1* | 9/2011 | Vickery ............... 43/131 |
| 2011/0283600 A1* | 11/2011 | Harper ............... 43/131 |
| 2012/0102821 A1 | 5/2012 | Jovic et al. |
| 2012/0124891 A1* | 5/2012 | Jovic et al. ............... 43/131 |
| 2013/0118056 A1 | 5/2013 | Covington |
| 2013/0174471 A1 | 7/2013 | Vickery et al. |
| 2013/0333273 A1 | 12/2013 | Esculier |

FOREIGN PATENT DOCUMENTS

| | | |
|---|---|---|
| EP | 2100504 A2 | 9/2009 |
| FR | 2564287 A1 | 11/1985 |
| GB | 2063040 A | 6/1981 |
| GB | 2394642 A | 5/2004 |
| JP | 2009159938 A | 7/2009 |
| WO | 2005006857 A2 | 1/2005 |
| WO | 2009157027 A1 | 12/2009 |

* cited by examiner

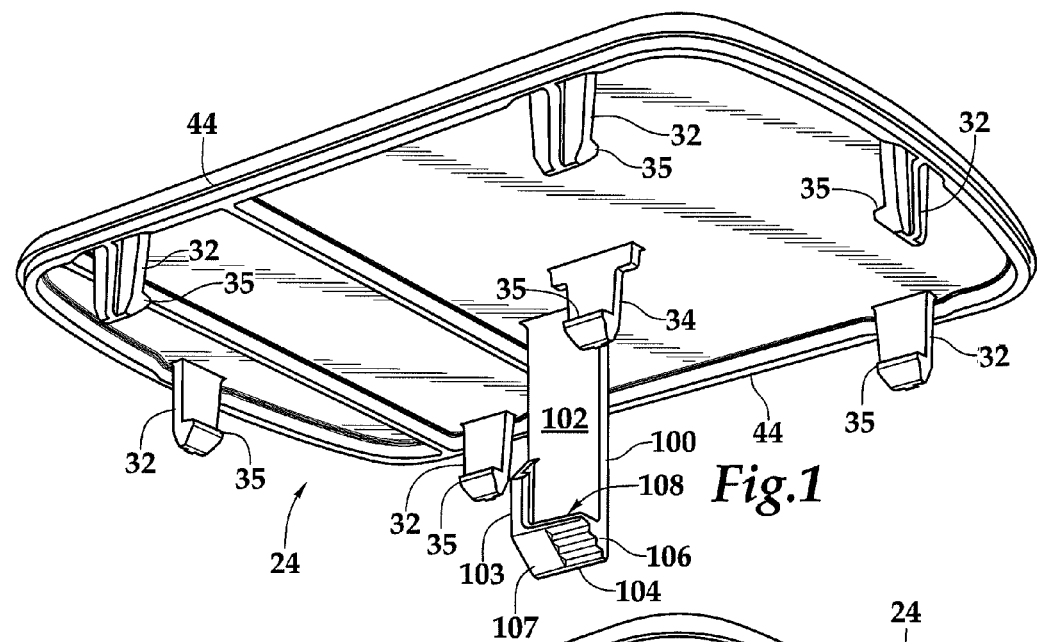
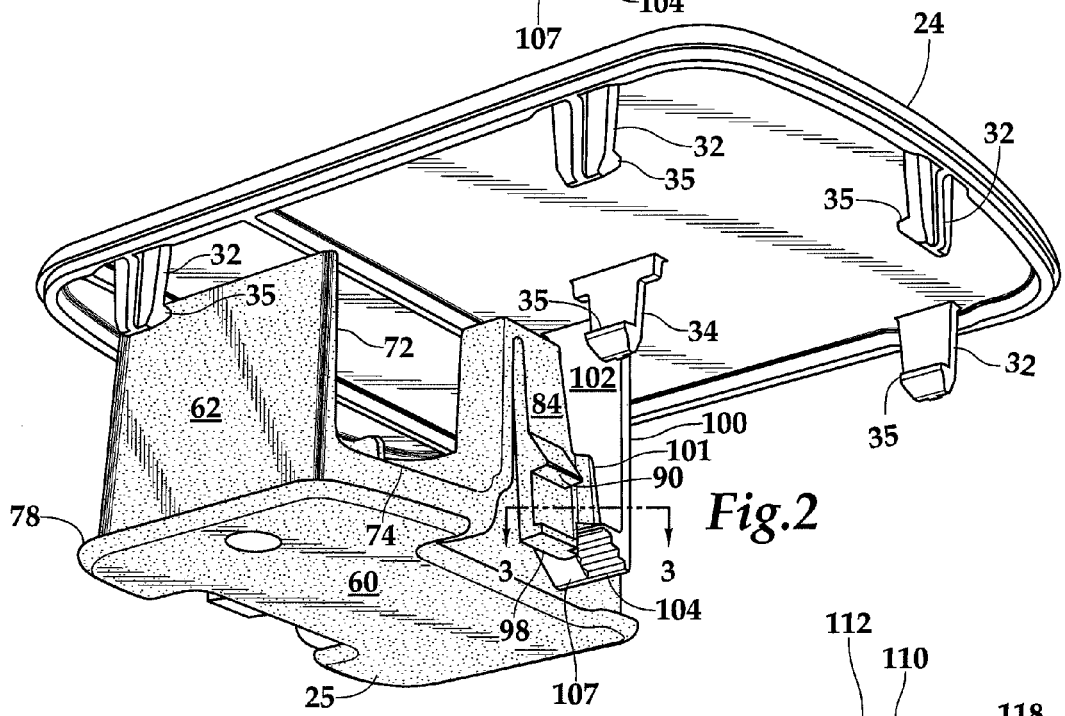
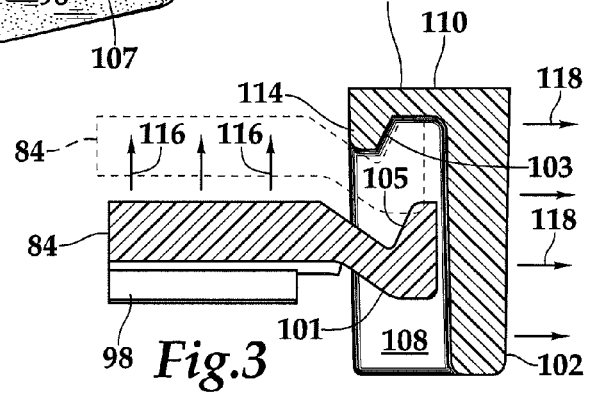

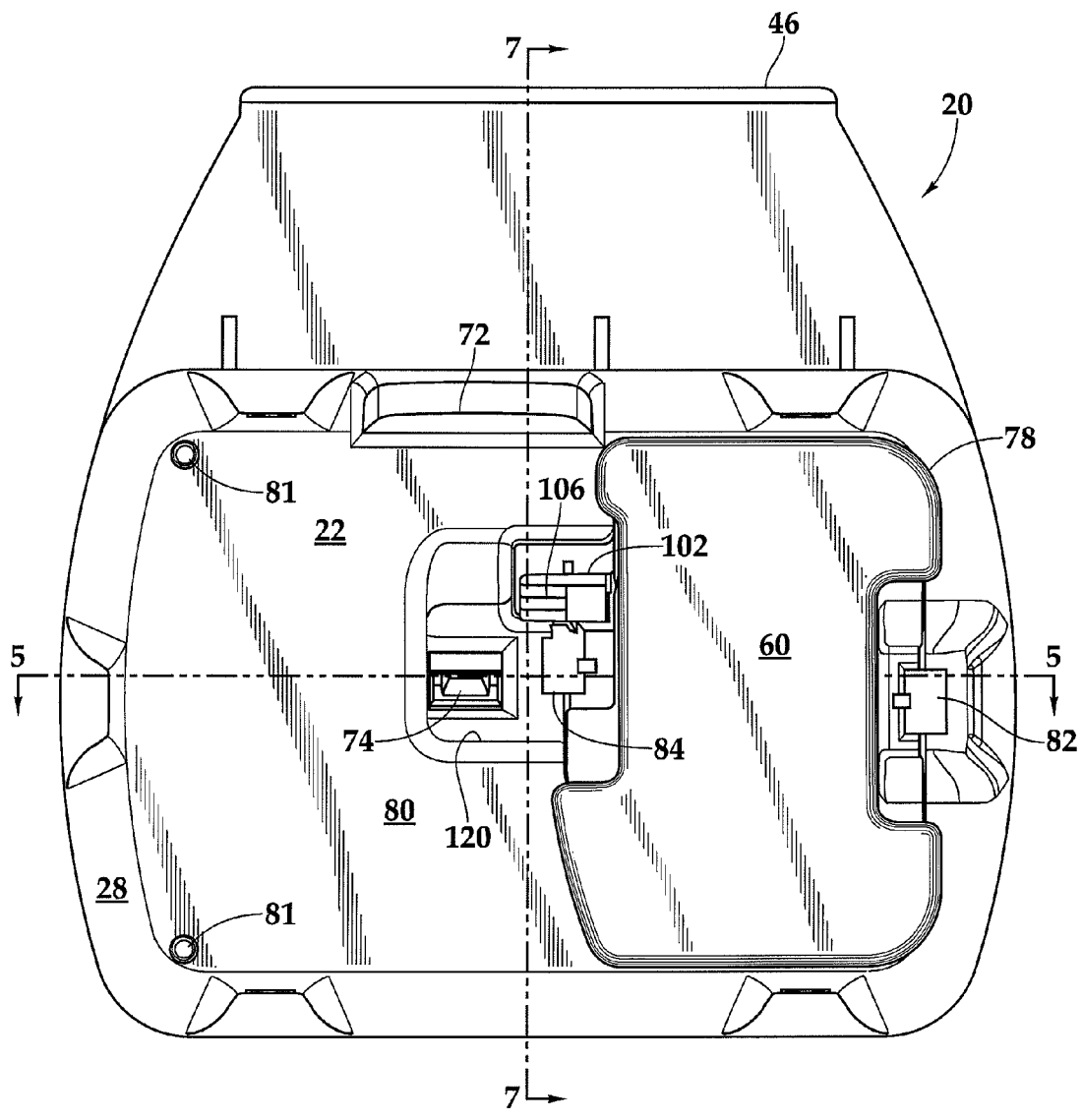
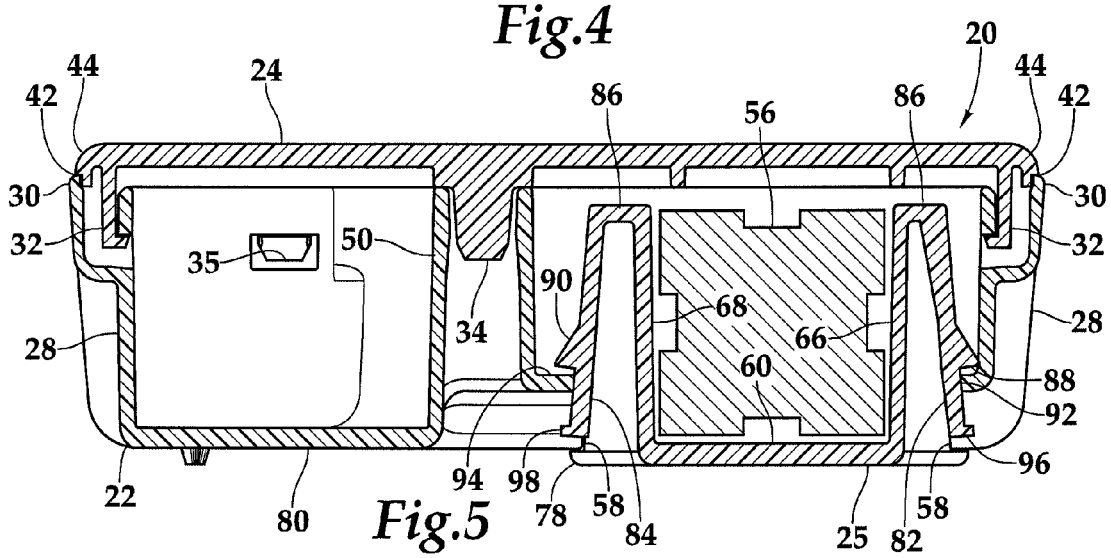

REBAITABLE RODENT BAIT STATION

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to rodent bait stations in general and to rodent bait stations for consumer use in particular.

Rodenticides can be particularly effective in treating infestations of rodent pests. Bait stations provide an effective mechanism for isolating the rodenticide from children, dogs, other pets, domestic animals, and non-target wildlife. Because the bait associated with the rodenticide can be attractive to non-targeted species, it is desirable to limit access to the rodenticide to dogs, for example, which can devote extended time to gaining entry to a container. Bait stations should not only obstruct the physical entry of the non-targeted species into the station, but also make it difficult for a pet to gain access to the interior by chewing or gnawing on the station. The bait station should also limit the access of children to the bait within.

One solution to making rodenticide baits available to consumers is to construct a disposable bait station which does not have provision for re-baiting and incorporates various features which isolate the bait and protect the bait from access by non-targeted species and pets and children, as described in co-pending U.S. application Ser. No. 12/983,725, filed on Jan. 3, 2011, which is incorporated herein by reference. However, in some circumstances where the domestic situation has a high level of or ongoing rodent infestation, it may be desirable to provide the consumer with a re-baitable bait station which still provides all the features which obstruct the physical access of the non-targeted species to the rodenticide bait, make it difficult for pets to gain access to the interior by chewing or gnawing on the station, and make it difficult for children to gain access to the bait.

SUMMARY OF THE INVENTION

The bait station of this invention is a consumer item, sized either for mice or rats, which may be pre-baited and more particularly which provides for re-baiting. Although incorporating one or more design features in order to make the bait station resistant to pets or people coming into contact with the bait contained within, the bait station also incorporates a removable bait receptacle which, while preserving the various design features described in co-pending U.S. application Ser. No. 12/983,725, filed on Jan. 3, 2011, provides the added functionality of the ability to replace the bait.

The bait station is constructed of three injection molded parts: a base part and a cover part which are locked together without provision for opening, and a removable bait receptacle which is removably locked to an opening in the bait station base. The base has a floor and a peripheral wall extending upwardly from the floor, the floor defining an exterior bottom surface. The floor of the bait station has an opening into which the bait station receptacle is received. The bait receptacle is designed to contain and closely surround a bait block. The bait receptacle has a floor surrounded by a receptacle peripheral wall which surrounds the bait on four sides, one side of which is partly cutaway to provide access from the interior of the bait station to a bait block held within the bait receptacle. The bait receptacle floor has a lip which extends beyond the receptacle peripheral wall and overlies the bait station base floor exterior bottom surface. The bait receptacle has resilient latch fingers on either side of the receptacle peripheral wall which engage corresponding surfaces within the bait station to lock the bait receptacle within the bait station. Removal of the bait receptacle is effected by squeezing extensions of the fingers which extend up along the sides of the receptacle and sliding the bait receptacle out of the bait station through the floor exterior bottom surface.

The bait station incorporates a key or combination lock consisting of a locking resilient finger which extends downwardly from the center of the cover to engage a flange which extends from one of the resilient fingers on the side of the bait receptacle. The locking finger locks to one of the latching fingers when the latch finger is deflected to release the bait receptacle, thus preventing the bait receptacle from being removed from the bait station. A resilient finger which extends downwardly from the cover is arranged to deflect in a direction which is perpendicular to the deflection direction of the resilient latching fingers on either side of the receptacle peripheral wall. The net effect is that to remove the bait station receptacle fours actions must be taken simultaneously: the locking finger must be deflected away from engagement with the latching finger on the side of the bait receptacle, and both bait receptacle latching fingers must be squeezed toward the bait receptacle at the same time that the bait receptacle is drawn out of the bait station.

It is an object of the present invention to provide a bait station which resists being opened by children, dogs, other pets, domestic animals, and non-target wildlife, and yet allows for replacement of the bait.

It is a further object of the present invention to provide a re-baitable bait station which better retains the enclosed bait.

It is another object of the present invention to provide a bait station which is resistant to a child removing the bait receptacle through a combination lock.

It is yet another object of the present invention to provide a rodent bait station which provides for visual inspection of the enclosed rodenticide.

Further objects, features and advantages of the invention will be apparent from the following detailed description when taken in conjunction with the accompanying drawings.

BRIEF DESCRIPTION OF THE DRAWINGS

FIG. 1 is an isometric view of the lid of the re-baitable bait station of this invention.

FIG. 2 is an isometric view of the lid of FIG. 1 shown in its relation to a removable bait receptacle, with the bait station base omitted for illustrative purposes.

FIG. 3 is a cross-sectional view of an enlarged detail of the engaged lid and bait receptacle of FIG. 2, taken along section line 3-3.

FIG. 4 is a bottom plan view of the re-baitable bait station of this invention.

FIG. 5 is a cross-sectional view of the re-baitable bait station of FIG. 4 taken along section line 5-5.

DESCRIPTION OF THE PREFERRED EMBODIMENTS

Figure 6:
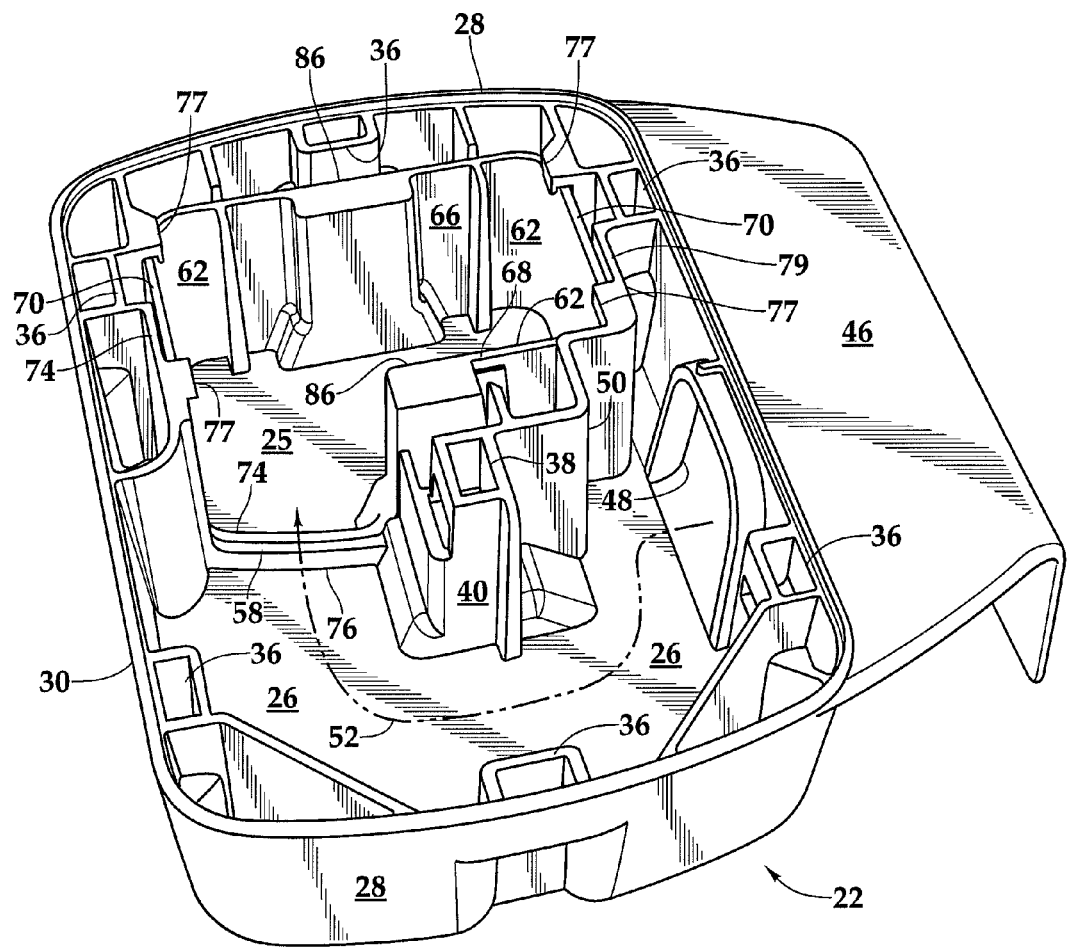
FIG. 6 is a top perspective view of the re-baitable bait station of FIG. 4 with the cover removed.
Figure 7:
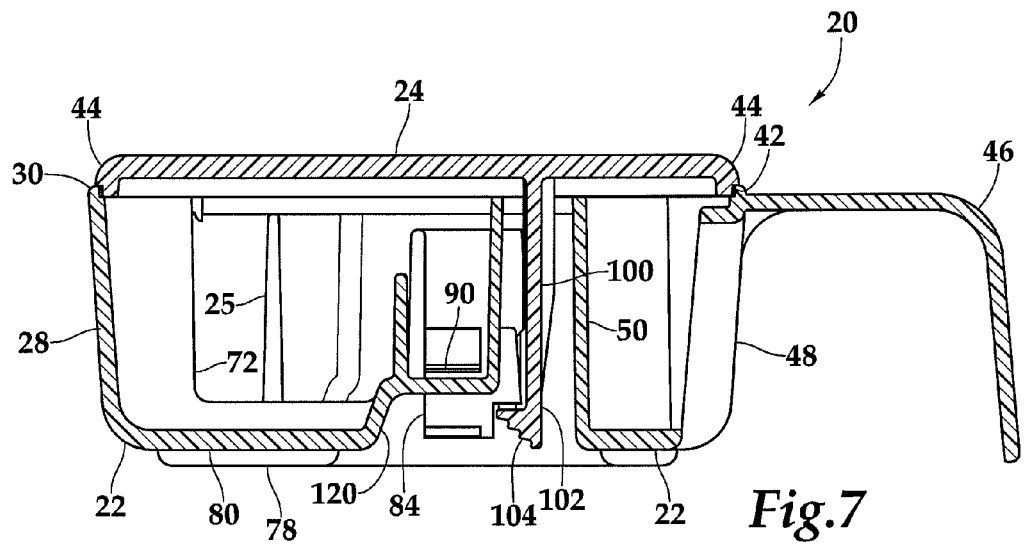
FIG. 7 is a cross-sectional view of the bait station of FIG. 4 taken along section line 7-7.

Referring more particularly to FIGS. 1-7 wherein like numbers refer to similar parts, a bait station 20 is shown in FIGS. 1-7. As shown in FIG. 7, the bait station 20 has a base 22 and lid 24, and a removable bait receptacle 25. As shown in FIG. 6, the base 22 has a floor 26 and an upwardly extending peripheral wall 28. The lid 24 is locked without provision for opening to the unbroken upper peripheral edge 30 of the wall 28 by six resilient peripheral prongs 32. A lid central prong 34 also extends to engage the base 22. As explained more fully in co-pending U.S. application Ser. No. 12/983, 725 the prongs 32, 34 are terminated by hooks 35 which latch within receptacles 36 formed in the base as shown in FIGS. 5 and 6. A central receptacle 38 is supported on a structure 40 which extends upwardly from the floor 26 of the base 22 engages the central prong 34 increasing the overall integrity and rigidity of the bait station 20 to crushing loads preventing the cover from being depressed or bulging out.

The upper peripheral edge 30 forms a labyrinth joint 42 between the peripheral wall 28 and the outer edge 44 of the lid 24. As shown in FIGS. 6 and 7, a carport shaped extension 46 extends from the peripheral edge 30 to cover a rodent access opening 48. The extension 46 creates a narrow passage which is open on both ends, which is attractive to rodents and makes the opening 48 more attractive. When the rodent enters the bait station 20 through the access opening 48, the peripheral wall 28 and the interior wall 50 direct the rodent along a path 52 shown in FIG. 6 which leads to a bait block 56 shown in FIG. 5 contained in the bait receptacle 25. The circuitous path 52 isolates the bait from the rodent access opening 48. The bait station base 22 and the lid 24 form a shell with an interior volume and an exterior surface with at least one entry 48 for rodents in the shell exterior surface, and at least one opening in the exterior shell surface into which the bait receptacle 25 can be positioned.

The design of the bait receptacle 25 allows removal of the receptacle through an opening 58 in the floor 26 of the base 22, without compromising the overall integrity of the bait station 20 with its features which resist children and non-target animals, particularly pets such as dogs, from gaining access to the bait positioned within the bait receptacle in the bait station 20. The bait receptacle 25 is shown in FIG. 2 as it is positioned with respect to the lid 24, and in FIG. 6 the bait receptacle 25 is shown as it is positioned with respect to the bait station base 22 when the bait receptacle is installed and locked within the bait station 20.

As shown in FIG. 2, the bait receptacle 25 has a receptacle floor 60 and a receptacle peripheral wall 62 extending upwardly from the receptacle floor to form bait retaining structures. As shown in FIG. 6, the peripheral wall defines a long rear wall 66, a long front wall 68, and two short side walls 70 which define a rectangular cavity which contains the bait block 56. The bait block 56 has the general shape of an extruded rectangular prism with additional gnaw edges provided by grooves in the faces of the bait block, such as the ones disclosed in U.S. Pat. No. 5,044,113, the disclosure of which is incorporated by reference herein. As shown in FIGS. 2 and 7, rodent access to the bait block 56 is provided by an opening 72 in the front wall 68 of the bait receptacle 25. The opening 72 is formed as a cutaway of the front wall, leaving a short knee wall 74 which abuts a knee wall 76 forming part of the bait station base 22. As best shown in FIGS. 2 and 4, the bait receptacle 25 floor 60 extends beyond the bait receptacle peripheral wall 62 to form a lip 78. The lip 78 underlies the exterior bottom surface 80 defined by the base floor 26 as shown in FIG. 4, when the removable bait receptacle 25 is installed within the bait station base 22. As shown in FIGS. 4 and 5, the lip 78 is rounded as it comes into engagement with the bottom surface 80 of the base floor 26. Two small feet 81 extend from the base bottom surface 80 to prevent rocking about the lip 78. The lip 78 prevents the bait receptacle from being pushed too far into the base 22 of the bait station 20 where it would push against and possibly unseat the lid.

Another feature, shown in FIG. 6, which performs a similar function comprises four clips 77 which extend from double wall structures 79 on the base 22 which run parallel to the short sides 70. The clips 77 extend outwardly to overlie the short side walls 70 and extend downwardly on the inside of the short side walls. The four clips 77 prevent movement of the bait receptacle 25 toward the lid 24, and also hold the short walls 70 of the bait receptacle to the double wall structures 79 of the base. The clips 77 are in part redundant with the lip structure 78 inasmuch as both structures prevent the bait receptacle 25 from being forced against the lid 24, which forcing against the lid has the possibility that the lid would become detached from the base 22. As at least partially redundant structures, either one alone can prevent the bait receptacle 25 from being forced against the lid 24. If both structures are used, the redundant load path resisting movement of the bait receptacle 25 toward the lid 24 means that one or the other structures 78, 77 will not be in direct engagement with the base 22, or the receptacle 25 respectively. Thus the lip 78 may overlie but not directly engage the exterior surface 80, or the clips 77 may be slightly spaced from the receptacle peripheral wall 62, however with sufficient force on the floor 26 of the base receptacle, both load paths may become engaged.

The bait receptacle 25 is held in place on the base by two resilient fingers comprising a rear resilient finger 82 and a front resilient finger 84 mounted to the rear wall 66 and front wall 68 respectively of the receptacle as shown in FIG. 5. The resilient fingers 82, 84 extend outwardly down from the upper margin 86 of the bait receptacle, the resilient fingers have hook features 88, and 90 respectively which are biased by the resiliency of the fingers to engage flange portions 92 and 94 which are integrally formed with the bait station base 22. The resilient fingers 82, 84 are in the locked position when the hook features 88, 90 are engaged with the flange portions 92, 94. The resilient fingers 82, 84 have lower extensions 96 and 98 which can be grasped with the thumb and forefinger. By squeezing the fingers 82, 84 inwardly against the sides 66, 68 of the bait receptacle 25 the hook features 88, 90 are disengaged from the flange portions 92, 94 and thus moved to an unlocked position which unlocks the bait receptacle from the base 22, and which allows the bait receptacle to be withdrawn through the opening 58 in the floor 26 of the base.

The bait station has a locking system which restricts access by a young child to the bait by requiring multiple steps to be performed simultaneously before the receptacle can be separated from the base. Removal of the bait receptacle 25 for the purposes of re-baiting is controlled by a locking or keying mechanism which includes another locking resilient finger 100 which extends downwardly from the lid 24 as shown in FIG. 1. The locking finger 100 has a narrow downwardly extending blade 102 cantilevered out from the lid 24 which terminates in a lower triangular prism shaped portion 104, a portion of which has a series of steps 106 to provide a gripping surface for deflecting the blade 102 which is biased against the front resilient finger 84, from a locked position engaged with the receptacle front resilient finger, to an unlocked position out of engagement with the receptacle front resilient finger. Another portion of the triangular prism shaped portion 104 forms a smooth ramp 107 to deflect the locking finger 100 when the bait receptacle 25 is inserted into the opening 58 in the floor 26 of the base 22. A cross-section of the locking system is shown in FIG. 3. The locking system prevents withdrawal of the bait receptacle 25 from the base 22 of the bait station 20. The locking system comprises two parts, a first part 101 formed as an extension of the receptacle front resilient finger 84, and a second part 103 mounted to the lid locking finger blade 102. The first part 101 extending from the front resilient finger 84 forms a hook 105. As shown in FIG. 1, the second part 103 extends upwardly from a base surface 108 which extends outwardly and perpendicularly from the blade 102 and which overlies the triangular prism shaped portion 104 as shown in FIG. 3. The second part 103 is an L-shaped flange 110 which extends from the blade 102 facing the first part 101. The L-shaped flange 110 has a longer leg 112 which extends perpendicular to the blade, and a shorter leg 114 which extends a short distance parallel to the blade 102. The short leg 114 forms a capturing feature which interlocks with a capturable structure formed by the hook 105.

In FIG. 3 the locking system is shown in the normal locked position so that an attempt to remove the bait receptacle 25 by squeezing extensions 96 and 98 to release the hooks 88, 90 causes the front resilient finger 84 to move in the direction of the arrows 116 causing the hook 105 of the first part 101 to capture the second part, i.e., come into engagement with the second part 103 formed by the L-shaped member 110 as shown by the phantom image in FIG. 3. When the first and second parts 101, 103 are in engagement as caused by an attempt to remove the receptacle 25 by squeezing extensions 96 and 98, the front resilient finger 84 moves toward the bait receptacle 25 and even allows the hook 90 to disengage from engagement flange 94 on the base 22, but the base surface 108 prevents the front resilient finger 84—and the bait receptacle 25 of which the resilient finger is a part—from being slid out of the base 22. At the same time, the locking finger 100 is prevented from moving in the direction of arrows 118 by the short leg 114 interlocking with the hook 105. The result is that, not only must the resilient fingers 82, 84 be moved by squeezing extensions 96 and 98 toward the sides of the bait receptacle 25, and the resilient finger 100 be moved in a direction perpendicular to the movement controlling the resilient fingers 82, 84, but a particular order of movement must be observed to place the system in an unlocked position. First the resilient finger 100 must be moved in the direction of arrows 118 and held out of the path of the hook 105. Then and only then, can the resilient front finger 84 be moved in the direction of arrows 116, this together with movement of the rear finger 82 on the other side of the bait receptacle 25 in a direction opposed to arrows 116, releases the bait receptacle from the base 22 of the bait station 20. The result is a re-baitable bait station 20 which is resistant to non-targeted animals, pets, and small children, while still allowing an adult to remove the bait receptacle 25 and replace the bait block 56.

The base is formed with a downwardly opening recess 120, as shown in FIGS. 4 and 7, which surrounds the lower triangular prism shaped portion 104 of the finger 100. The recess 120 allows the finger 100 to not protrude from the base and yet still be accessible for actuation.

It should be understood that where structure is shown in the drawings or described in the specification the corresponding structure which is described in more detail, for example with respect to structure, function and advantage in the co-pending application Ser. No. 12/983,725 is incorporated herein so as to be applied to the particular similar structure disclosed herein.

It is understood that the invention is not limited to the particular construction and arrangement of parts herein illustrated and described, but embraces all such modified forms thereof as come within the scope of the following claims.

We claim:

1. A re-baitable rodent bait station comprising:
   a bait station comprising a bait station interior and a bait station exterior surface;
   portions of the bait station exterior surface defining an opening;
   a bait receptacle removably positionable within the bait station to extend through the opening and substantially within the bait station interior, wherein the bait receptacle has a floor and bait retaining structures extending from the floor, wherein the floor has a flange such that when the bait receptacle is positioned substantially within the bait station interior, the flange underlies the bait station exterior surface;
   a lock mounted between the bait receptacle and the bait station, the lock comprising:
   a first member resiliently mounted to the bait receptacle which is movable between a locked position and an unlocked position, which unlocks the bait receptacle from the bait station, and;
   a second member, configured to interact with the first member, resiliently mounted to the bait station which is movable between a locked and an unlocked position, wherein the first member is mounted for movement in a first direction and the second member is mounted for movement in a second direction that is substantially perpendicular to the first direction, such that when the first member is moved in the first direction to the unlocked position and the second member is moved in the second direction to the unlocked position, then and only then can the movement of the second member be effective in releasing the removable bait receptacle from the bait station.

2. The re-baitable rodent bait station of claim 1 wherein the second resiliently mounted member has portions which capture a structure on the first resilient member.

3. The re-baitable rodent bait station of claim 1 wherein there are two first resiliently mounted members, mounted to the bait receptacle, and wherein each first resiliently mounted member is movable between a locked position which locks the bait receptacle to the bait station, and an unlocked position which unlocks the bait receptacle from the bait station, and wherein the second resilient member engages only one of the two first resiliently mounted members.

4. The re-baitable rodent bait station of claim 1 wherein portions of the bait station exterior surface base define a downwardly opening recess which surrounds portions of the second member, such that the second member is accessible for actuation.

5. The re-baitable rodent bait station of claim 1 wherein the second member is resiliently mounted to the bait station by extending downwardly from a lid which is non-removably connected to the base.

6. A rodent bait station comprising:
   a molded plastic base, having a floor surrounded by a peripheral wall extending upwardly from the floor, the peripheral wall having an upper unbroken peripheral edge;
   an injection molded plastic cover locked without provision for opening to the base along the upper unbroken perimeter, the cover defining with the base peripheral wall and floor a bait station interior, the cover having portions defining an outer peripheral edge;

wherein portions of the base peripheral wall define at least one rodent access opening which provides access to the bait station interior;

wherein portions of the floor of the base define an opening;

a removable bait receptacle which is positioned extending through the opening in the bait station floor so as to position bait contained within the receptacle within the bait station interior, the bait station receptacle defining an interior which communicates with the bait station interior;

at least a first resiliently mounted finger, mounted to the bait receptacle and biased so as to retain the bait receptacle within the base, the first resiliently mounted finger movable to a position to release the bait receptacle;

at least a second resiliently mounted finger mounted to the base, which is biased so as to retain the bait receptacle within the base and is configured to interact with the first resiliently mounted finger; and wherein the first resiliently mounted finger is mounted for movement in a first direction and the second resiliently mounted finger is mounted for movement in a second direction substantially perpendicular to the first direction such that the movement in the first direction of the first resiliently mounted finger and the movement of the second resiliently mounted finger comprises an unlatch position, wherein then and only then can the movement of the second resiliently mounted finger be effective in releasing the removable bait receptacle from the base.

7. The rodent bait station of claim 6 wherein the second resiliently mounted finger has portions which capture a structure on the first resiliently mounted finger.

8. The rodent bait station of claim 6 wherein there are two first resiliently mounted fingers, mounted to the bait receptacle, and wherein each first resiliently mounted finger is movable between a locked position which locks the bait receptacle to the base, and an unlocked position which unlocks the bait receptacle to the base, and wherein the second resiliently mounted finger engages only one of the two first resiliently mounted fingers.

9. The rodent bait station of claim 6 wherein portions of the base define a downwardly opening recess which surrounds portions of the second resiliently mounted finger, such that it is accessible for actuation.

10. The rodent bait station of claim 6 wherein the second resiliently mounted finger is resiliently mounted to the base by extending downwardly from a lid which is non-removably connected to the base.

11. A bait station comprising:
a shell defining an interior volume and an exterior surface;
a bait receptacle containing a bait block;
wherein the exterior surface has portions defining a rodent access opening which communicates with the shell interior volume, and an opening which receives the bait receptacle so that the bait block is accessible to a rodent which enters through the rodent access opening into the interior volume of the shell;
wherein the bait receptacle has a flange extending outward from a lower portion such that when the bait receptacle is positioned substantially within the interior volume, the flange underlies the bait station exterior surface such that the bait receptacle extends from the exterior surface into the interior volume;
a locking mechanism arranged between the shell and the bait receptacle, the locking mechanism having at least a first movable element that is mounted for movement in a first direction and a second movable element that is mounted for movement in a second direction substantially perpendicular to the first direction, arranged such that the first movable element must be moved first, and the second movable element must be moved second in order for the bait receptacle to be withdrawn from the shell.

* * * * *